(12) United States Patent  
Sakata

(10) Patent No.: US 9,176,693 B2  
(45) Date of Patent: Nov. 3, 2015

(54) ELECTRONIC DEVICE THAT AUTOMATICALLY REGISTERS ALTERNATIVE USER OPERATION

(71) Applicant: Kyocera Document Solutions Inc., Osaka (JP)

(72) Inventor: Hiromi Sakata, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/529,206

(22) Filed: Oct. 31, 2014

(65) Prior Publication Data

US 2015/0116777 A1    Apr. 30, 2015

(30) Foreign Application Priority Data

Oct. 31, 2013    (JP) .................................. 2013-226598

(51) Int. Cl.
*G06F 3/12*    (2006.01)
*H04N 1/32*    (2006.01)
(Continued)

(52) U.S. Cl.
CPC .............. *G06F 3/1273* (2013.01); *G06F 3/121* (2013.01); *G06F 3/1207* (2013.01); *G06F 3/1259* (2013.01); *G06Q 30/0283* (2013.01); *H04N 1/00408* (2013.01); *H04N 1/32112* (2013.01); *H04N 2201/0087* (2013.01); *H04N 2201/0094* (2013.01); *H04N 2201/3202* (2013.01); *H04N 2201/3215* (2013.01); *H04N 2201/3216* (2013.01); *H04N 2201/3219* (2013.01)

(58) Field of Classification Search
CPC ............ G06F 3/1208; G06F 17/30569; G06F 17/30575; G06F 3/0482; G06F 3/04883; G06F 3/1232; G06F 3/1242; G06F 3/1251; G06F 3/1256; G06F 3/1264; G06F 3/1285; G06F 3/1288; H04N 7/181
USPC ......... 358/1.15, 1.9, 1.1, 1.18, 1.5, 498, 1.13, 358/1.14, 1.16, 1.2, 1.4, 1.8, 2.1, 301, 3.06, 358/3.09, 3.12, 448, 474, 488, 502, 504, 358/505, 520, 523; 709/201, 203, 217, 220, 709/226, 231
See application file for complete search history.

(56) References Cited

U.S. PATENT DOCUMENTS 6,535,932 B1 *    3/2003    Endoh et al. ....................... 710/7
7,002,702 B1 *    2/2006    Machida ....................... 358/1.15
(Continued)

FOREIGN PATENT DOCUMENTS

JP    2012-221505 A    11/2012

*Primary Examiner* — Negussie Worku
(74) *Attorney, Agent, or Firm* — James W. Judge

(57) ABSTRACT

An electronic device includes a log management unit and an assist function managing unit. The log management unit stores job logs containing, in relation to jobs, set content and execution result, and at least one of: required time, or printed sheet count and printed page count. The assist function managing unit: (a) extracts failed-job job logs in which the execution results indicate failure from the log management unit; (b) extracts successful-job job logs, corresponding to the failed-job job logs, in which, for jobs on a document executed immediately after a failed job on the document, the execution results indicate normal termination; and (c) registers, as operation assist functions, alternative user operations in terms of setting operations for successful jobs corresponding to the failed jobs that meet predetermined conditions in terms of the at least one of: required time, or printed sheet count and printed page count.

6 Claims, 5 Drawing Sheets

(51) Int. Cl.
*H04N 1/00* (2006.01)
*G06Q 30/02* (2012.01)

(56) References Cited

U.S. PATENT DOCUMENTS

| | | | | |
|---|---|---|---|---|
| 7,330,282 B2 * | 2/2008 | Matsumoto | ............ | 358/1.15 |
| 8,166,542 B2 * | 4/2012 | Uno | ............ | 726/21 |
| 8,244,144 B2 * | 8/2012 | Tsuzuki | ............ | 399/10 |
| 8,407,335 B1 * | 3/2013 | Church et al. | ............ | 709/224 |
| 2006/0250631 A1 * | 11/2006 | Igarashi | ............ | 358/1.13 |
| 2009/0254780 A1 * | 10/2009 | Mizuno | ............ | 714/48 |
| 2009/0303518 A1 * | 12/2009 | Sekiya | ............ | 358/1.15 |
| 2014/0293335 A1 * | 10/2014 | Kikuchi et al. | ............ | 358/1.15 |
| 2015/0077796 A1 * | 3/2015 | Masuda | ............ | 358/1.15 |
| 2015/0156361 A1 * | 6/2015 | Kayama | ............ | 358/1.15 |
| 2015/0212468 A1 * | 7/2015 | Adachi | ............ | 358/1.15 |
| 2015/0242734 A1 * | 8/2015 | Kumagai | ............ | 358/1.15 |

* cited by examiner

ELECTRONIC DEVICE THAT AUTOMATICALLY REGISTERS ALTERNATIVE USER OPERATION

INCORPORATION BY REFERENCE

This application is based upon, and claims the benefit of priority from, corresponding Japanese Patent Application No. 2013-226598 filed in the Japan Patent Office on Oct. 31, 2013, the entire contents of which are incorporated herein by reference.

BACKGROUND

Unless otherwise indicated herein, the description in this section is not prior art to the claims in this application and is not admitted to be prior art by inclusion in this section.

Along with the recent multifunctionality of an image forming apparatus, a user operation when using an image forming apparatus has been complicated. Therefore, as means to improve operability, the image forming apparatus includes an operation assist function such as a panel program and a one-touch key. These functions reduce a load of an operation of the user by preliminarily registering a specific function or a sequence of functions to a specific key.

In a certain image forming apparatus, an administrator registers a program or a workflow executed combining a plurality of operations. Then, the image forming apparatus suggests the program or the workflow to users.

SUMMARY

An electronic device according to one aspect of the disclosure includes a log management unit and an assist function managing unit. The log management unit stores job logs containing, in relation to jobs, set content and execution result, and at least one of: required time, or printed sheet count and printed page count. The assist function managing unit: (a) extracts failed-job job logs in which the execution results indicate failure from the log management unit; (b) extracts successful-job job logs, corresponding to the failed-job job logs, in which, for jobs on a document executed immediately after a failed job on the document, the execution results indicate normal termination; and (c) registers, as operation assist functions, alternative user operations in terms of setting operations for successful jobs corresponding to the failed jobs that meet predetermined conditions in terms of the at least one of: required time, or printed sheet count and printed page count.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
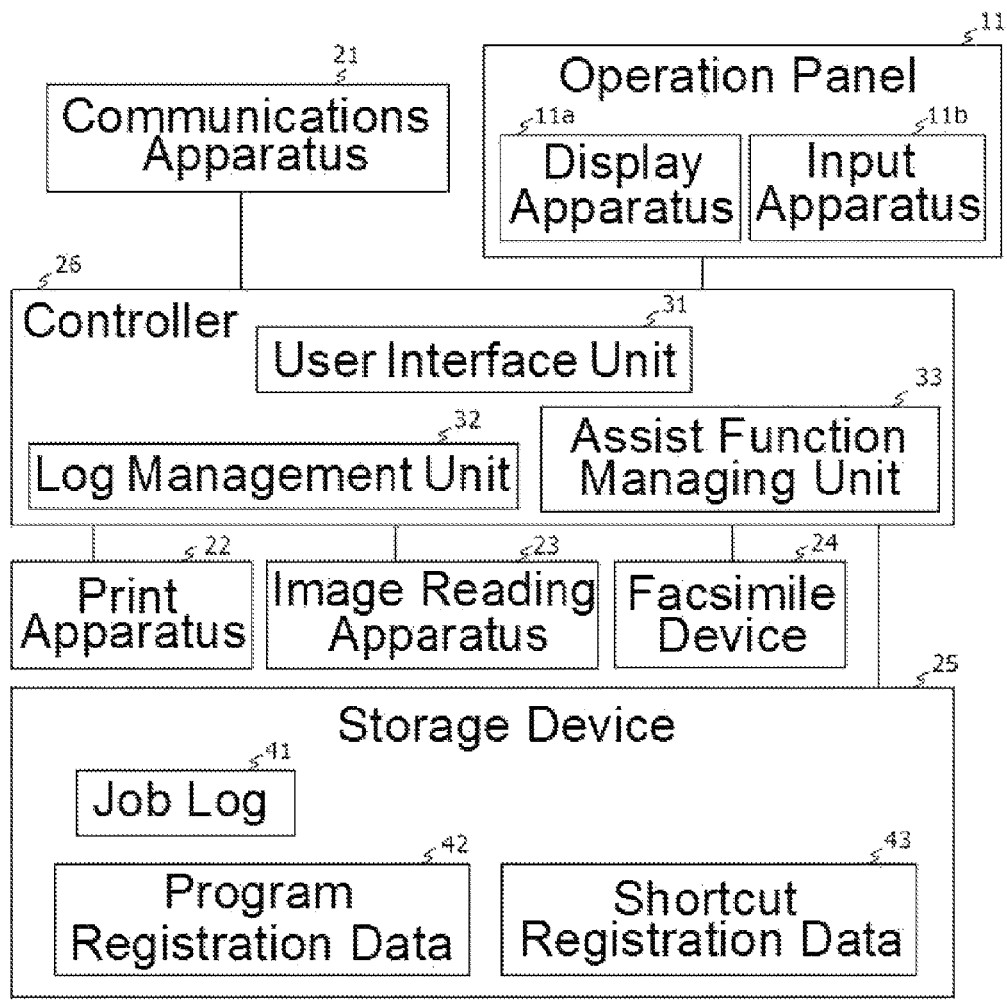
FIG. 1 illustrates a constitution of an image forming apparatus of an exemplary electronic device according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure based on the drawings.

FIG. 1 illustrates a constitution of an image forming apparatus of an exemplary electronic device according to one embodiment of the disclosure.

In this embodiment, the image forming apparatus illustrated in FIG. 1 is a multi-functional peripheral with a printing function, an image reading function, and a facsimile function. This image forming apparatus includes an operation panel 11, a communications apparatus 21, a print apparatus 22, an image reading apparatus 23, a facsimile device 24, a storage device 25, and a controller 26.

The operation panel 11 includes a display apparatus 11a, such as a liquid crystal display, and an input apparatus 11b, such as a touch panel. The operation panel 11 displays an operation screen for a user and detects an input operation by the user. The display apparatus 11a displays the operation screen for the user. The input apparatus 11b accepts a user operation input by the user.

Figure 2:
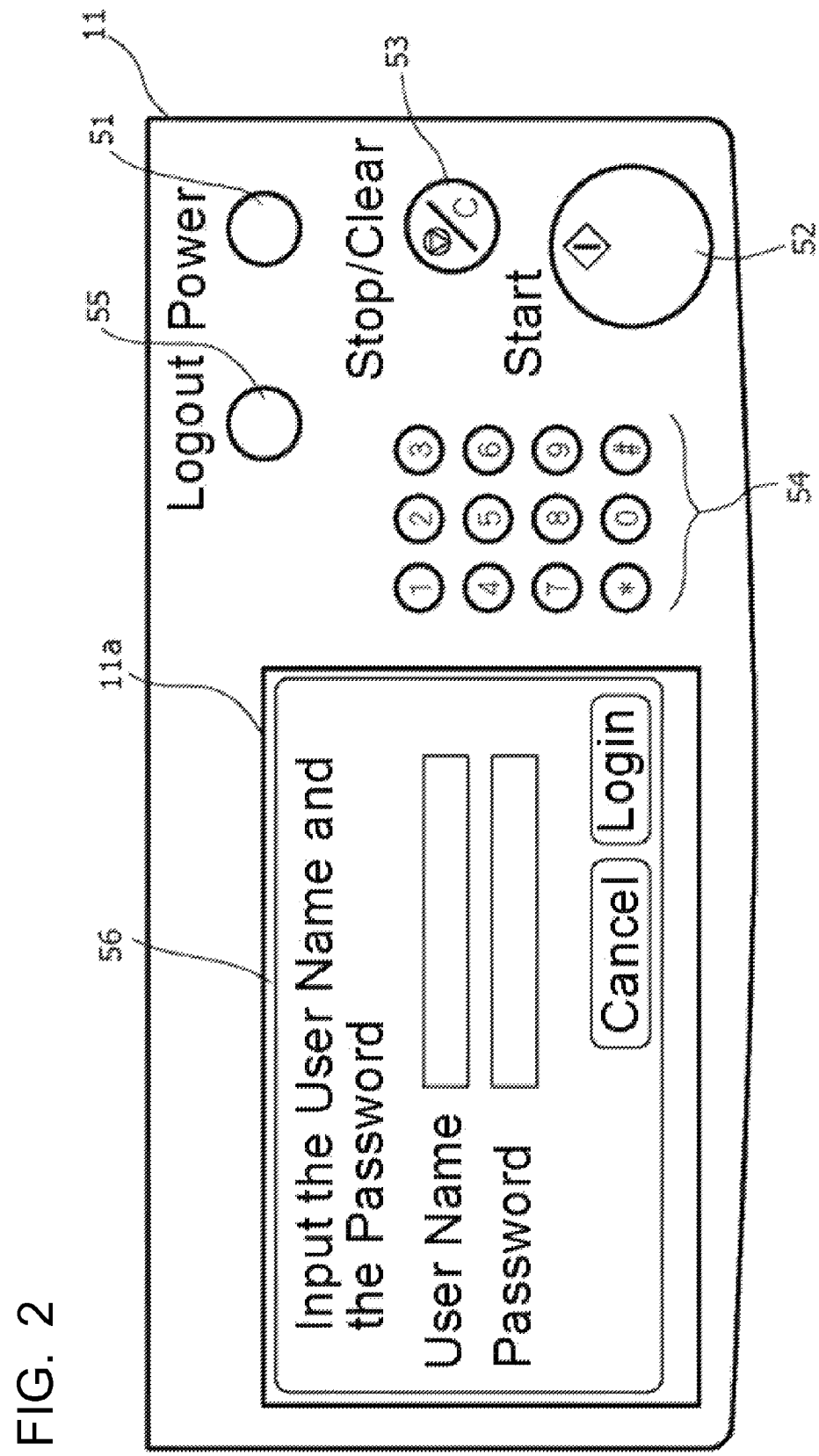
FIG. 2 illustrates a front view of an operation panel according to the one embodiment.

FIG. 2 illustrates a front view of the operation panel 11 in FIG. 1. The operation panel 11 illustrated in FIG. 2 includes hardware keys 51 to 55 and a touch panel 56 as the input apparatus 11b. The hardware key 51 is a power key. The hardware key 52 is a start key. The hardware key 53 is a stop/clear key. The hardware key 54 is a numeric keypad. The hardware key 55 is a logout key. The touch panel 56 is arranged at a display surface of the display apparatus 11a.

The communications apparatus 21 is connectable to a host apparatus (not illustrated) over a network or a similar medium. The communications apparatus 21 is an apparatus that performs data communications in a predetermined communication protocol.

The print apparatus 22 is an internal device that prints a document image on a printing paper sheet in, for example, an electrophotographic system.

The image reading apparatus 23 is an internal device that optically reads a document image from a document to generate image data of the document image.

The facsimile device 24 is an internal device having a receiving function and a transmitting function. The receiving function receives a facsimile signal and converts the facsimile signal into image data. The transmitting function converts the image data into the facsimile signal and transmits the facsimile signal.

The storage device 25 is a non-volatile storage device such as a hard disk drive and a flash memory. The storage device 25 stores, for example, data and a program.

The controller 26 includes a computer that includes, a Central Processing Unit (CPU) (not illustrated), a Read Only Memory (ROM), a Random Access Memory (RAM), or a similar unit. The controller 26 loads a program stored in the ROM or the storage device 25 to the RAM. The CPU executes the program to operate as various processors.

In this embodiment, the controller 26 operates as a user interface unit 31, a log management unit 32, and an assist function managing unit 33.

The user interface unit 31 causes the display apparatus 11a of the operation panel 11 to display a screen. According to an input operation detected by the input apparatus 11b of the operation panel 11, the user interface unit 31 causes the screen displayed at the display apparatus 11a to transition.

Figure 3:
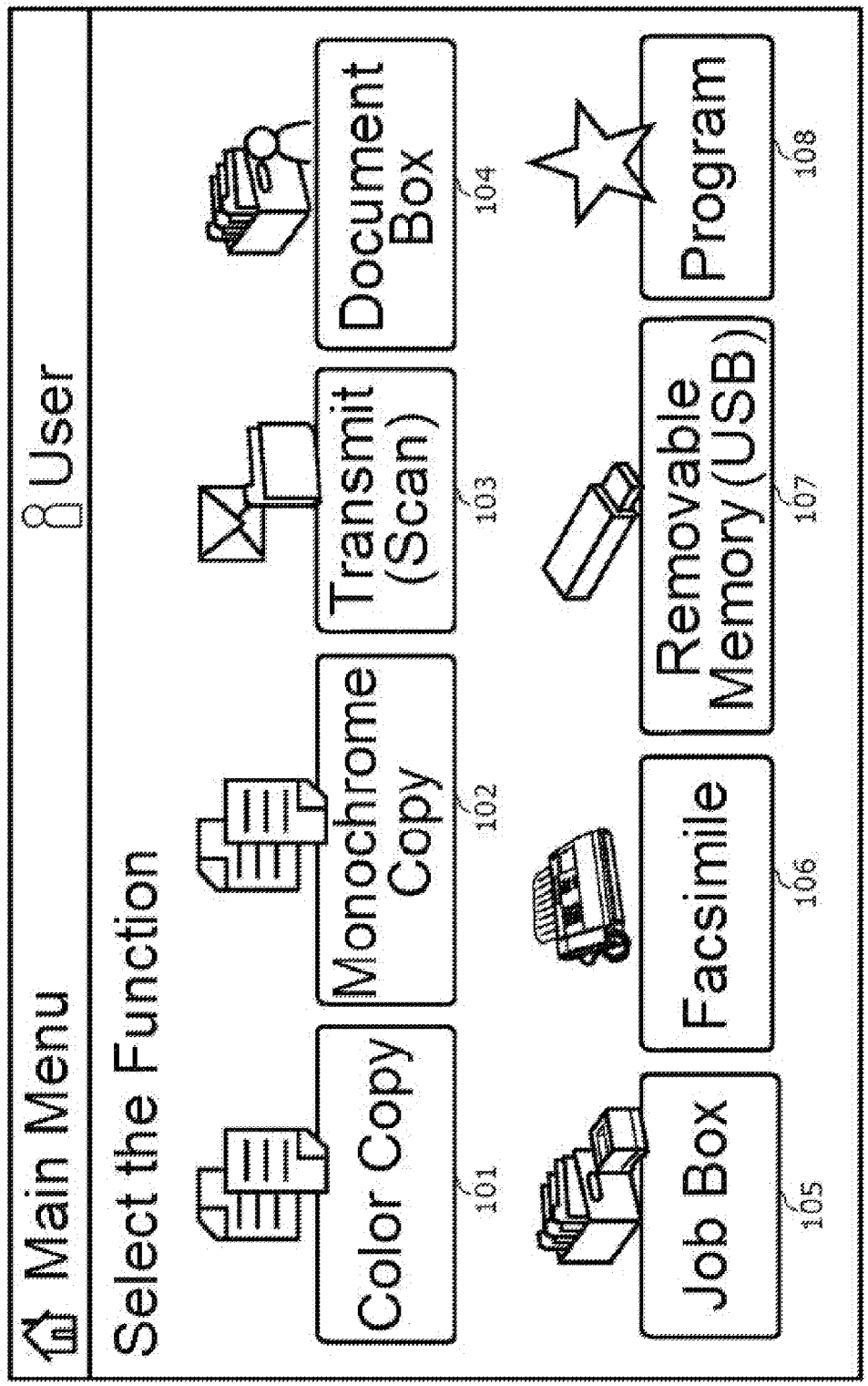
FIG. 3 illustrates an exemplary main menu screen according to the one embodiment.
Figure 4:
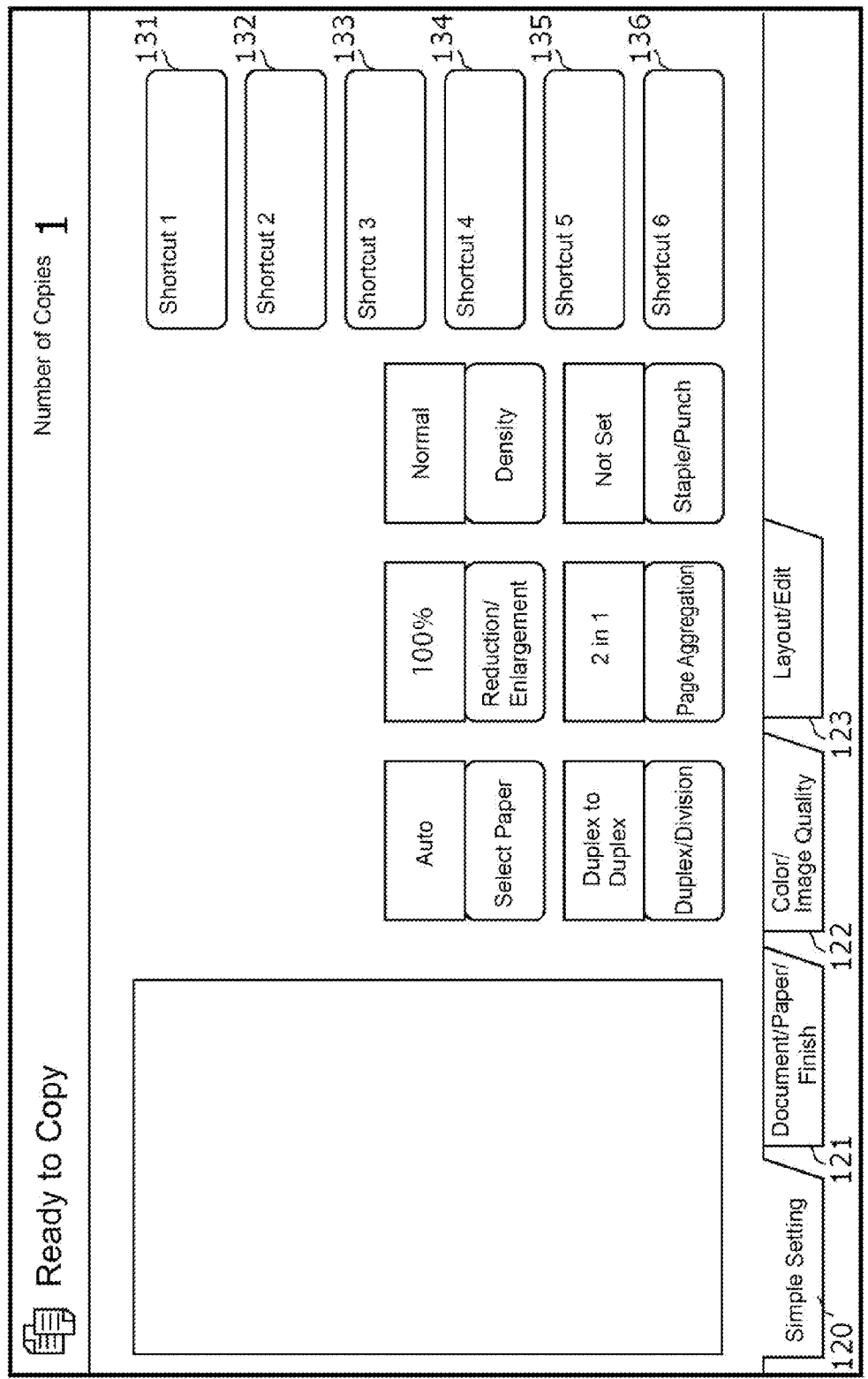
FIG. 4 illustrates an exemplary setting screen of a copy function according to the one embodiment.

FIG. 3 illustrates an exemplary main menu screen. FIG. 4 illustrates an exemplary setting screen of a copy function.

In this image forming apparatus 1, after the user logs in at a login screen illustrated in FIG. 2, first, the user interface unit 31 causes a main menu screen as illustrated in FIG. 3 to be displayed. The main menu screen displays icons 101 to 107 for various functions, such as the copy function and the transmitting function, and a program icon 108. The program icon 108 is to display a list screen of a program key.

When pressing the icons 101 and 102 for the copy function on the main menu screen in FIG. 3, the user interface unit 31 causes a setting screen for copy function as illustrated in FIG. 4 to be displayed. The setting screen for copy function includes tabs 120 to 123 on each setting item. The setting screen for copy function also displays shortcut keys 131 to 136, each of which is one of the operation assist functions.

Whenever this image forming apparatus executes a job of each function (such as the copy function), the log management unit 32 records a job log 41 of the job into the storage device 25.

Specifically, in this embodiment, the log management unit 32 stores the job log 41 including the following information regarding the job.

(1) Date and time of execution;
(2) Document image (for example, only the first page);
(3) Set content (paper sheet type, the number of copies, the number of aggregations, duplex/single-side, or a similar content);
(4) Setting time required to input set values of various setting items for the job;
(5) Execution time;
(6) The number of used printing paper sheets, namely, the printed sheet count;
(7) Print count (the printed page count);
(8) Printing rate of the entire job;
(9) Execution result (normal termination, abnormal termination, cancel, or a similar result); and
(10) Required time (sum of setting time required for the setting and time required for job execution).

The document image refers to a scanned page image in the case of copy. The document image refers to a rendered page image in the case of print.

The log management unit 32 stores the job log 41 indicative of failures of the above-described execution results. The job log 41 relates to a job cancelled by the user before termination, an abnormally terminated job, and a job re-executed on the same document with different setting at immediately after the termination. Here, assume the case when, for example, a document is placed on a platen and the job at this time is executed without detection of opening and closing of a document cover after the termination of the previous job. Upon the use of an automatic document feeder (ADF), if an image same as the document image read at the previous job is determined as being read at this time job by pattern matching or a similar method, it is determined that the job is re-executed on the same document.

The assist function managing unit 33 regularly analyzes the job log repeatedly. As necessary, the assist function managing unit 33 automatically registers an alternative user operation with an operation assist function.

Here, the operation assist function includes a program function and a shortcut function. The program function ensures inputting a set value to a setting item by one-time user operation to the program key. The shortcut function ensures jumping to a setting screen for the setting item by the one-time user operation to the shortcut key.

Specifically, the assist function managing unit 33 performs the following.

(a) The assist function managing unit 33 extracts the job log 41 of a failed job indicative of a failure of the execution result.
(b) The assist function managing unit 33 extracts the job log 41 of a successful job indicative of normal termination of the execution result executed on the same document at immediately after the failed job, corresponding to the job log 41 of the failed job. Then, the assist function managing unit 33 detects the failed job meeting a predetermined condition of at least one of: the required time, or the printed sheet count and the printed page count.
(c) The assist function managing unit 33 registers the alternative user operation to the setting operation of the successful job corresponding to the detected failed job, with the operation assist function. Here, the assist function managing unit 33 registers the setting operation for the successful job (namely, input of a set value to the setting item) with the program key (one of the alternative user operations).

In this embodiment, the assist function managing unit 33 performs the following.

(a) The assist function managing unit 33 performs one of the following processes. The assist function managing unit 33 performs a process for specifying the required time. Additionally, the assist function managing unit 33 performs a process for specifying a product of the printed sheet count and a paper sheet cost coefficient (preliminary input cost of one sheet of printing paper sheet) and a sum of a product of the printed page count and the print cost coefficient (preliminary input cost such as a maintenance cost for one page) as a required cost.
(b) The assist function managing unit 33 specifies the setting operations for the successful jobs corresponding to the predetermined number of failed jobs starting from the largest required time or required cost with the job log 41. The assist function managing unit 33 registers the alternative user operations to the specified setting operations with the operation assist function.

The assist function managing unit 33 may perform the following processes.

(a) Executing both of the processes for specifying the required time and the process for specifying the required cost.
(b) Registering the alternative user operations to the setting operations of the successful jobs corresponding to the predetermined number of failed jobs with the operation assist function, starting from the largest sum of the product of the required time and a predetermined labor cost coefficient and the required cost.

The required cost may include toner cost corresponding to the above-described printing rate.

The storage device 25 stores program registration data 42 and shortcut registration data 43 as registration data of the operation assist function. The program registration data 42 indicates a setting item and the set value associated with the program key for the program function. The shortcut registration data 43 indicates a setting screen of a setting item associated with the shortcut key for the shortcut function.

That is, the assist function managing unit 33 analyzes the job log 41 regularly and repeatedly as described above and updates the program registration data 42 or similar data based on the analysis result.

Furthermore, the assist function managing unit 33 associates the extracted failed job with the successful job and causes the display apparatus 11a to display the failed job and the successful job.

Next, the following describes operations by the above-described image forming apparatus.

Every time a job of a function such as the copy function is executed, the log management unit 32 stores the job log 41 of the job into the storage device 25.

Figure 5:
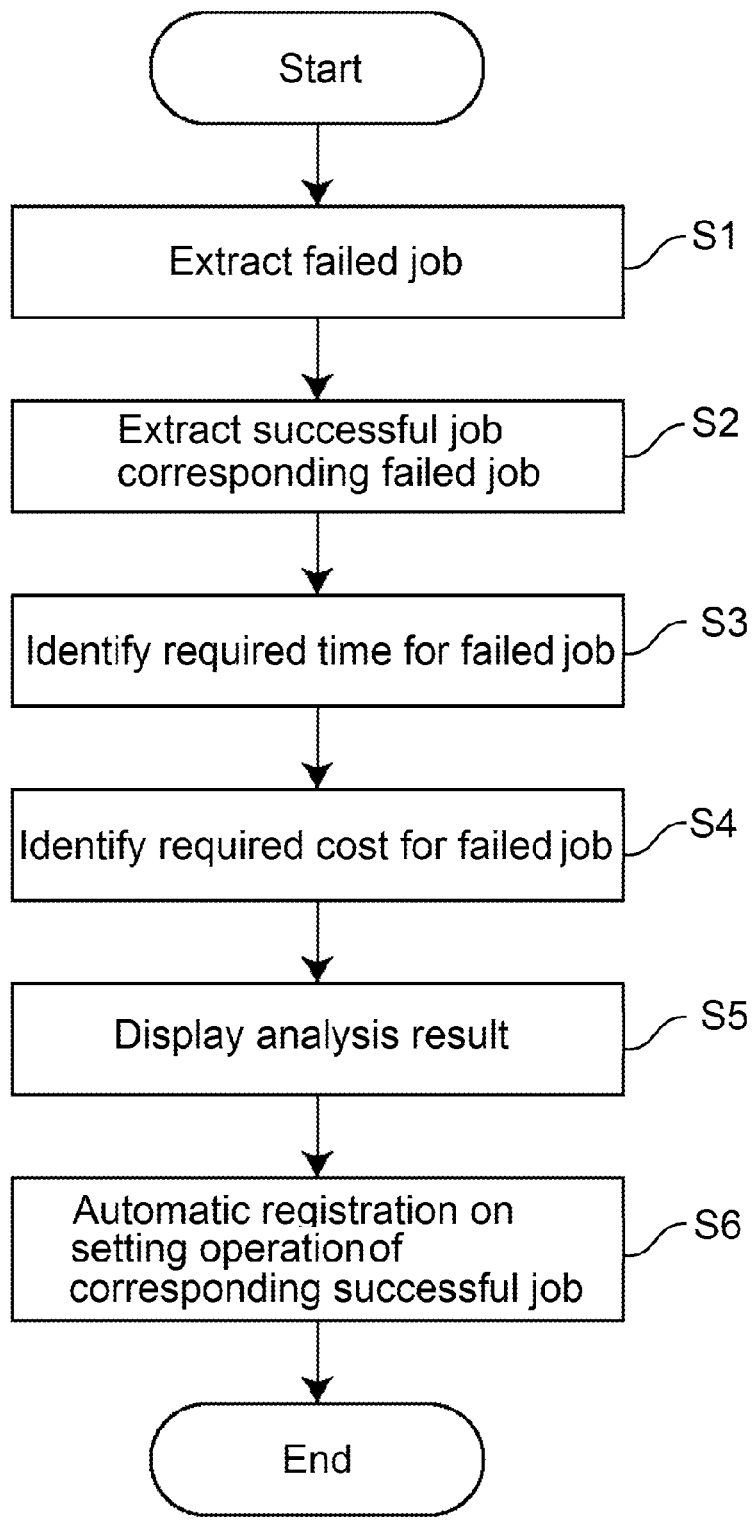
FIG. 5 illustrates an operation of an assist function managing unit according to the one embodiment.

Meanwhile, the assist function managing unit 33 regularly and repeatedly analyzes the job log 41 and updates the registration data 42 and 43 of the operation assist function as described later. FIG. 5 illustrates an operation of the assist function managing unit 33 according to the one embodiment.

First, the assist function managing unit 33 extracts the job log 41 of the failed job, which indicates a failure of the execution result, among the job logs 41 stored in the storage device 25 (Step S1).

Next, the assist function managing unit 33 extracts the job log 41 of the successful job, which indicates a normal termination of the execution result executed on the same document immediately after the failed job (that is, the document image approximately same as the document image in the job log 41 of the failed job and the job log 41 having the execution result of normal termination) as the job log of the successful job corresponding to the job log of the failed job (Step S2).

The assist function managing unit 33 specifies the required time for the failed job with reference to the job log 41 of the failed job (Step S3). Further, the assist function managing unit 33 specifies the required cost for the failed job (Step S4).

Then, the assist function managing unit 33 causes the display apparatus 11a to display the required time and the required cost of the failed job as an analysis result regarding the failed job together with a set content of the failed job, a set content of the successful job, or a similar content (Step S5). This ensures the user to know the set content of the failed job and the required time and the required cost of the failed job.

Afterwards, the assist function managing unit 33 specifies the set content with reference to the successful-job job logs corresponding to the failed job. Then, the assist function managing unit 33 registers the alternative user operation corresponding to the set content (that is, registration of the set content with the program key) (Step S6).

As described above, according to the above-described embodiment, the log management unit 32 stores the job log 41. The job log 41 includes the set content regarding the job, the execution result, and at least one of: the required time, or the printed sheet count and the printed page count. Then, the assist function managing unit 33 performs the following.
   (a) The assist function managing unit 33 extracts the job log of the failed job, which indicates a failure of the execution result.
   (b) The assist function managing unit 33 extracts the job log of the successful-job job logs, which indicates normal termination of the execution result executed on the same document at immediately after the failed job, corresponding to the job log of the failed job. Then, the assist function managing unit 33 registers the alternative user operation to the setting operation of the successful job corresponding to the failed job meeting predetermined conditions on at least one of: the required time, or the printed sheet count and the printed page count, with the operation assist function.

This automatically registers the alternative user operation to the setting operation, which yields wasteful time and high cost upon failure. That is, this automatically registers the alternative user operation where a high effect brought by the operation assist function can be expected.

The above-described embodiments are preferred examples of the disclosure. However, the disclosure is not limited to these embodiments, and various modifications and changes of the embodiments may be made without departing from the gist of the disclosure.

The disclosure is applicable to an image forming apparatus such as a multi-functional peripheral.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image-forming electronic device having imaging and printing functionality, the image-forming electronic device comprising:
   a log management unit for recording into storage logs of imaging and printing jobs executed by the image-forming electronic device, each log containing, per job, a job record including job-settings content and job-execution result, and at least either 1) required job time, being time required for setting up and inputting a job into the image-forming electronic device, summed with time required to execute the job, or 2) job printed-sheet count and job printed-page count; and
   an assist function managing unit for
      (a) extracting, from logs recorded by the log management unit, failed-job job records in which the execution results indicate failure,
      b) performing one of either a process of identifying failed-job required job times for the jobs in the failed-job job records, or a process of identifying, as failed-job required job costs, the sum of the product of the printed-sheet counts for the jobs in the failed-job job records and a per-sheet cost coefficient, and the product of the printed-page counts for the jobs in the failed-job job records and a per-page printing cost coefficient,
      (c) extracting, from logs recorded by the log management unit, job records, corresponding to the failed-job job records, of successful jobs, executed on an identical document directly after a failed job, for which the job-execution results indicate normal termination, and
      (d) registering, as operation assist functions of the image-forming electronic device, alternative user operations in terms of setting operations for successful jobs that correspond to a failed-job count predetermined from the largest of the failed-job required job times or the failed-job required job costs.

2. The electronic device according to claim 1, wherein the assist function managing unit associates failed jobs with successful jobs, and causes a display apparatus to display the associations.

3. An image-forming electronic device having imaging and printing functionality, the image-forming electronic device comprising:
- a log management unit for recording into storage logs of imaging and printing jobs executed by the image-forming electronic device, each log containing, per job, a job record including job-settings content and job-execution result, and at least either 1) required job time, being time required for setting up and inputting a job into the image-forming electronic device, summed with time required to execute the job, or 2) job printed-sheet count and job printed-page count; and
- an assist function managing unit for
  - (a) extracting, from logs recorded by the log management unit, failed-job job records in which the execution results indicate failure,
  - (b) performing both a process of identifying failed-job required job times for the jobs in the failed-job job records, and a process of identifying, as failed-job required job costs, the sum of the product of the printed-sheet counts for the jobs in the failed-job job records and a per-sheet cost coefficient, and the product of the printed-page counts for the jobs in the failed-job job records and a per-page printing cost coefficient,
  - (c) extracting, from logs recorded by the log management unit, job records, corresponding to the failed-job job records, of successful jobs, executed on an identical document directly after a failed job, for which the job-execution results indicate normal termination, and
  - (d) registering, as operation assist functions of the image-forming electronic device, alternative user operations in terms of setting operations for successful jobs that correspond to a failed job count predetermined from the largest of sums of the product of the failed-job required job times and a labor cost coefficient, and the failed-job required job costs.

4. The electronic device according to claim 3, wherein the assist function managing unit associates failed jobs with successful jobs, and causes a display apparatus to display the associations.

5. An image-forming electronic device having imaging and printing functionality, the image-forming electronic device comprising:
- a log management unit for recording into storage logs of imaging and printing jobs executed by the image-forming electronic device, each log containing, per job, a job record including job-settings content and job-execution result, and at least either required job time, or job printed-sheet count and job printed-page count, the job logs including job records in which with respect to jobs cancelled before termination, abnormally terminated jobs, and jobs re-executed on an identical document with different settings directly after termination, the execution results indicate failure; and
- an assist function managing unit for
  - (a) extracting, from logs recorded by the log management unit, failed-job job records in which the execution results indicate failure,
  - (b) extracting, from logs recorded by the log management unit, job records, corresponding to the failed-job job records, of successful jobs, executed on an identical document directly after a failed job, for which the job-execution results indicate normal termination, and
  - (c) registering, as operation assist functions of the image-forming electronic device, alternative user operations in terms of setting operations for successful jobs that correspond to failed jobs meeting predetermined conditions in terms of the at least either required job time, or job printed-sheet count and job printed-page count.

6. The electronic device according to claim 5, wherein the assist function managing unit associates failed jobs with successful jobs, and causes a display apparatus to display the associations.

* * * * *